(12) United States Patent
Huang et al.

(10) Patent No.: US 8,561,901 B2
(45) Date of Patent: Oct. 22, 2013

(54) OPTICAL IDENTIFICATION MODULE DEVICE AND OPTICAL READER HAVING THE SAME

(75) Inventors: Kuo-Shu Huang, Xinfeng Township, Hsinchu County (TW); Ming-I Lee, Taichung (TW)

(73) Assignee: Generalplus Technology Inc., Hsinchu (TW)

( * ) Notice: Subject to any disclaimer, the term of this patent is extended or adjusted under 35 U.S.C. 154(b) by 266 days.

(21) Appl. No.: 13/067,429

(22) Filed: Jun. 1, 2011

(65) Prior Publication Data
US 2012/0235037 A1    Sep. 20, 2012

(30) Foreign Application Priority Data

Mar. 16, 2011  (TW) .............................. 100108964 A

(51) Int. Cl.
*G06K 7/10*    (2006.01)
(52) U.S. Cl.
USPC ..................................... 235/454; 235/462.32
(58) Field of Classification Search
USPC ................. 235/454, 462.32, 462.42
See application file for complete search history.

(56) References Cited

U.S. PATENT DOCUMENTS

| | | | | |
|---|---|---|---|---|
| 6,592,040 B2 * | 7/2003 | Barkan et al. | ............ | 235/472.01 |
| 6,648,225 B2 * | 11/2003 | Harris et al. | .................. | 235/454 |
| 8,286,878 B2 * | 10/2012 | Nunnink | .................. | 235/472.01 |
| 2012/0118967 A1 * | 5/2012 | Gerst et al. | .................... | 235/455 |

* cited by examiner

*Primary Examiner* — Ahshik Kim
(74) *Attorney, Agent, or Firm* — Bacon & Thomas, PLLC

(57) ABSTRACT

An optical identification module device has a light pipe integrally formed with transparent material, a lens holder, a lens, a sensing circuit board and a light emitting diode. A light source container and a guiding recess are arranged on one side of the light pipe. A first light channel is defined in the light pipe. An engaging bump and a separating bump aligned with the engaging bump are arranged on one side of the lens holder. The engaging bump engages with the guiding recess. A second light channel corresponding to the first light channel is defined in the lens holder, and the lens is arranged in the second light channel. The sensing circuit board with a receiver soldered at a position corresponding to the second light channel is arranged at the bottom of the lens holder. The light emitting diode is placed in the light source container.

13 Claims, 5 Drawing Sheets

US 8,561,901 B2

OPTICAL IDENTIFICATION MODULE DEVICE AND OPTICAL READER HAVING THE SAME

CROSS REFERENCE TO RELATED APPLICATION

This application claims the benefits of the Taiwan Patent Application Serial Number 100108964, filed on Mar. 16, 2011, the subject matter of which is incorporated herein by reference.

BACKGROUND OF THE INVENTION

1. Field of the Invention

The present invention relates to the technical field of optical identification and, more particularly, to an optical identification module device and an optical reader having the same.

2. Description of Related Art

In order to increase the convenience, pleasure, and efficiency in document reading, a direct approach is to embed optical identify codes in pictures printed on various documents and use an optical reading pen to read the optical identification codes corresponding to a part of pictures, so that an output device is operated to produce, for example, a voice output in accordance with the read optical identification codes, thereby using a voice to effectively assist the reading.

FIG. 1 is a cross-sectional view of an optical reading pen 100 in the prior art. As shown in FIG. 1, the optical reading pen 100 is comprised of an optical identification module 110, a main circuit board 130, and a pen housing 150. The optical identification module 110 is soldered on the main circuit board 130 via a pin header 125. The optical identification module 110 and the main circuit board 130 are installed in the pen housing 150 to completely form the optical reading pen 100.

The optical identification module 110 includes a plastic housing 111. A light channel 123 is defined in the plastic housing 111. A clipping holder 113 corresponding to the light channel 123 is arranged for fixing a convex lens 115. A sensing circuit board 117 is arranged in the module 110 at the bottom corresponding to the clipping holder 113. A receiver 119 is arranged on one side of the sensing circuit board 117 corresponding to the convex lens 115. The other side of the sensing circuit board 117 has four welding holes for soldering at two infrared LEDs 121.

In operation, the infrared LEDs 121 emit infrared light onto a document surface to thus produce a reflective light. The reflective light passes through the light channel 123 and reaches to the convex lens 115 for being focused and further transmitted to the receiver 119. After receiving the focused reflective light, the receiver 119 converts it into an identifiable display signal.

For focusing the light emitted by the infrared LEDs 121 on the document surface in operation, there is a need to bend two pins of the infrared LEDs 121 at an angle before the infrared LEDs 121 are soldered to the sensing circuit board 117, which increases the working time and cost. In addition, the bent angle has to match the shape of the plastic housing 111, and the size and shape of the pen housing 150 are limited by the optical identification module 110, so that the size of the pen housing 150 cannot be reduced or the shape cannot be changed. Further, the prior optical identification module 110 is soldered to the main circuit board 130 via the pin header 125, which also increases the cost.

In the prior art, another approach is to use a heat shrink tube to fixedly hold the infrared LEDs on the plastic housing. However, such a way adds the subsequently processing cost because each heat shrink tube has a different shrinkage. Therefore, it is desirable to provide an improved module to mitigate and/or obviate the aforementioned problems.

SUMMARY OF THE INVENTION

The object of the present invention is to provide an optical identification module device and an optical reader having the same, which can reduce the volume of the optical reader to be more compact and also reduce the cost and processing time.

In one aspect of the invention, an optical identification module device is provided. The optical identification module device includes a light pipe, a lens holder, a lens, a sensing circuit board, and at least one light emitting diode. The light pipe is made of transparent material. At least one light source container and at least one guiding recess extended from the light source container are arranged on one side of the light pipe. A first light channel is defined in the light pipe. At least one engaging bump and at least one separating bump aligned with the engaging bump are arranged on one side of the lens holder. The engaging bump correspondingly engages with the guiding recess. A second light channel corresponding to the first light channel is defined in the lens holder, and the lens is arranged in the second light channel. The sensing circuit board with a receiver soldered at a position corresponding to the second light channel is arranged at the bottom of the lens holder. The at least one light emitting diode has a light emitting body placed in the at least one light source container and two pins extended from the light emitting body. The two pins are electrically connected to the sensing circuit board along two sides of the at least one separating bump.

In another aspect of the invention, an optical reader is provided. The optical reader includes an optical identification module device and a main circuit board. The optical identification module device includes a light pipe, a lens holder, a lens, a sensing circuit board, and at least one light emitting diode. The light pipe is made of transparent material. A first light channel is defined in the light pipe. The lens holder engages with the light pipe. A second light channel corresponding to the first light channel is defined in the lens holder, and the lens is arranged in the second light channel. The sensing circuit board with a receiver soldered at a position corresponding to the second light channel is arranged at the bottom of the lens holder. A plug part is formed on one side of the circuit board. A plurality of golden fingers arranged on the plug part are electrically connected to the receiver. The at least one light emitting diode has a light emitting body placed at two sides of the light pipe and two pins extended from the light emitting body. The two pins are electrically connected to the sensing circuit board. A slot is defined in the main circuit board for allowing the plug part of the sensing circuit board to be vertically inserted in the main circuit board, so that the sensing circuit board is electrically connected to the main circuit board.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
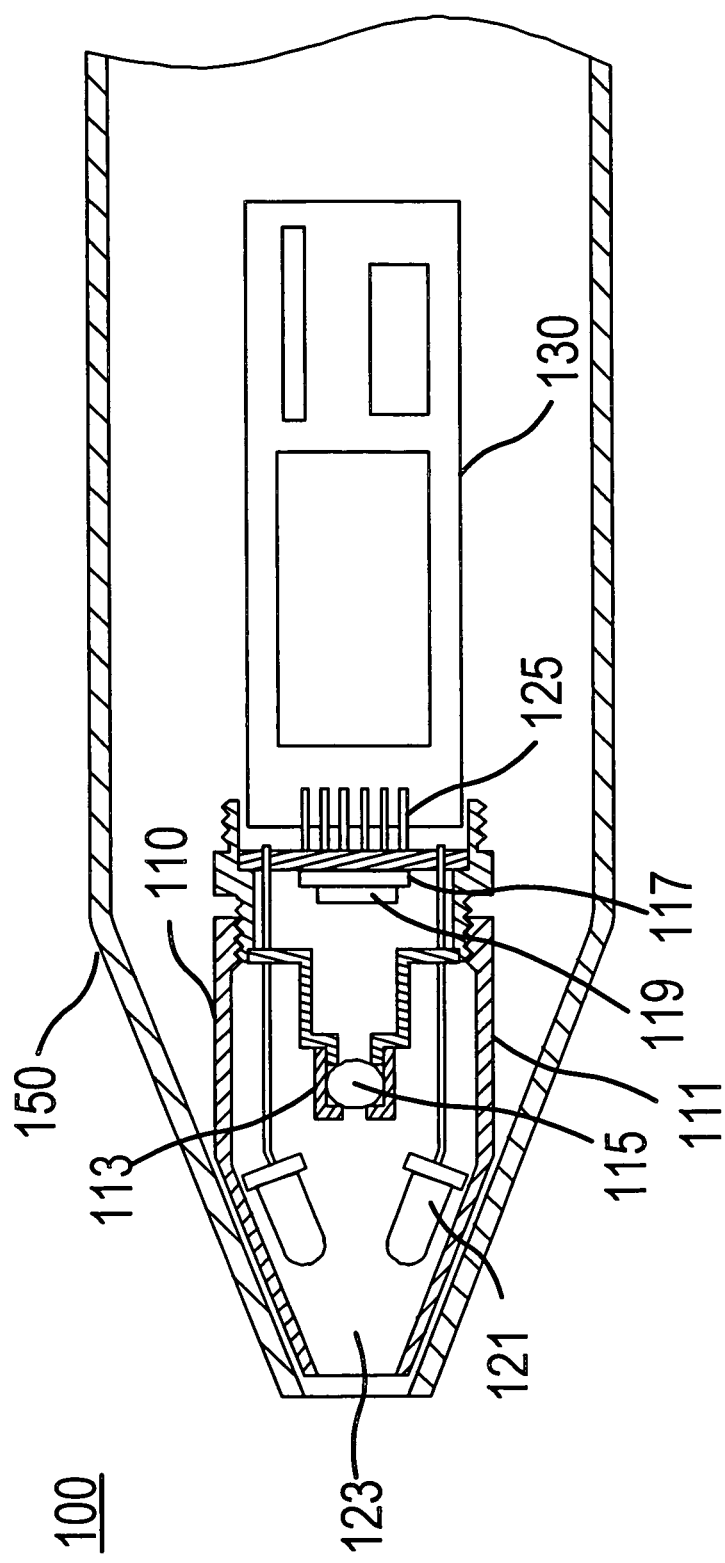
FIG. 1 is a cross-sectional view of an optical reading pen in the prior art.
Figure 2:
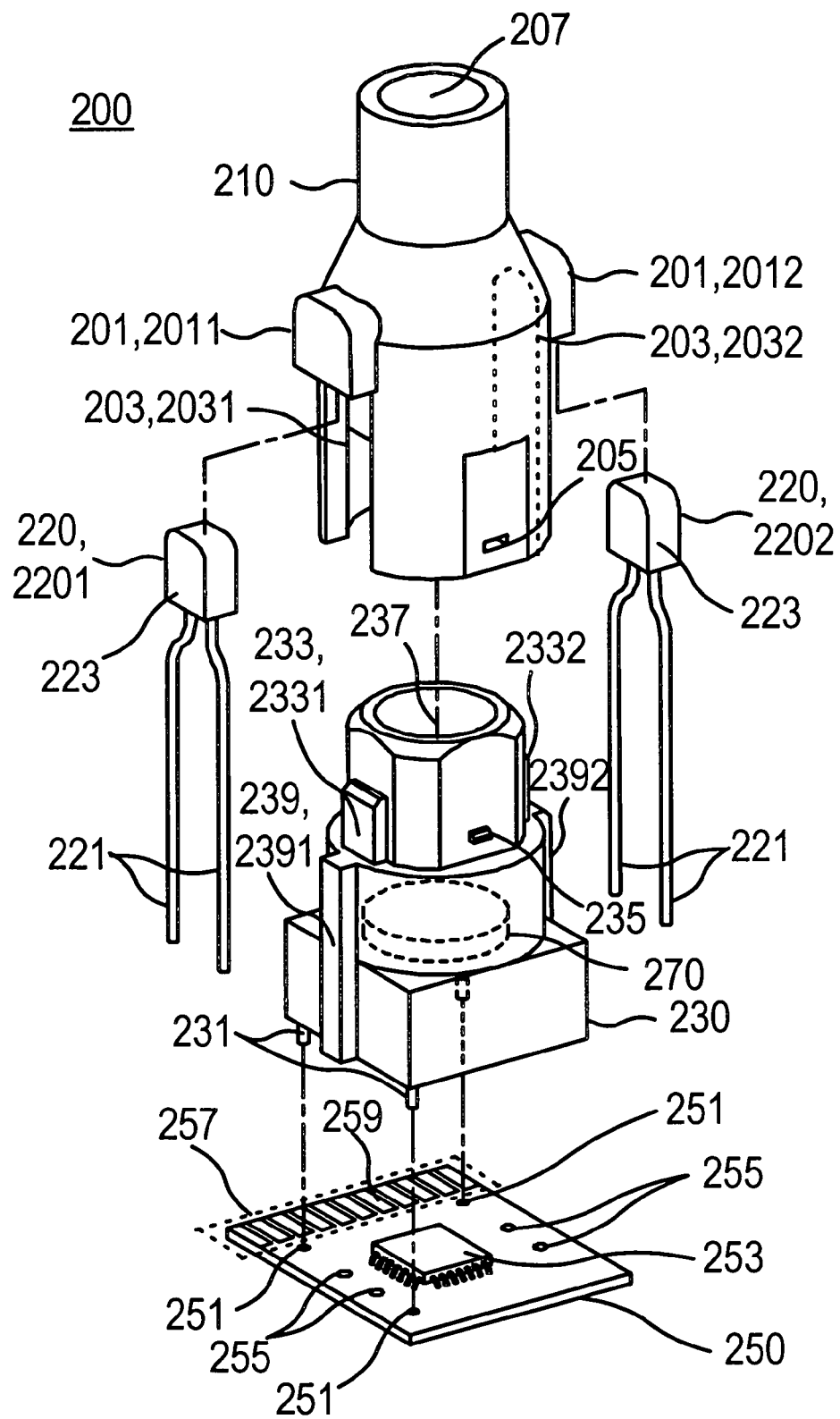
FIG. 2 is an exploded view of the optical identification module device in accordance with an embodiment of the invention.
Figure 3:
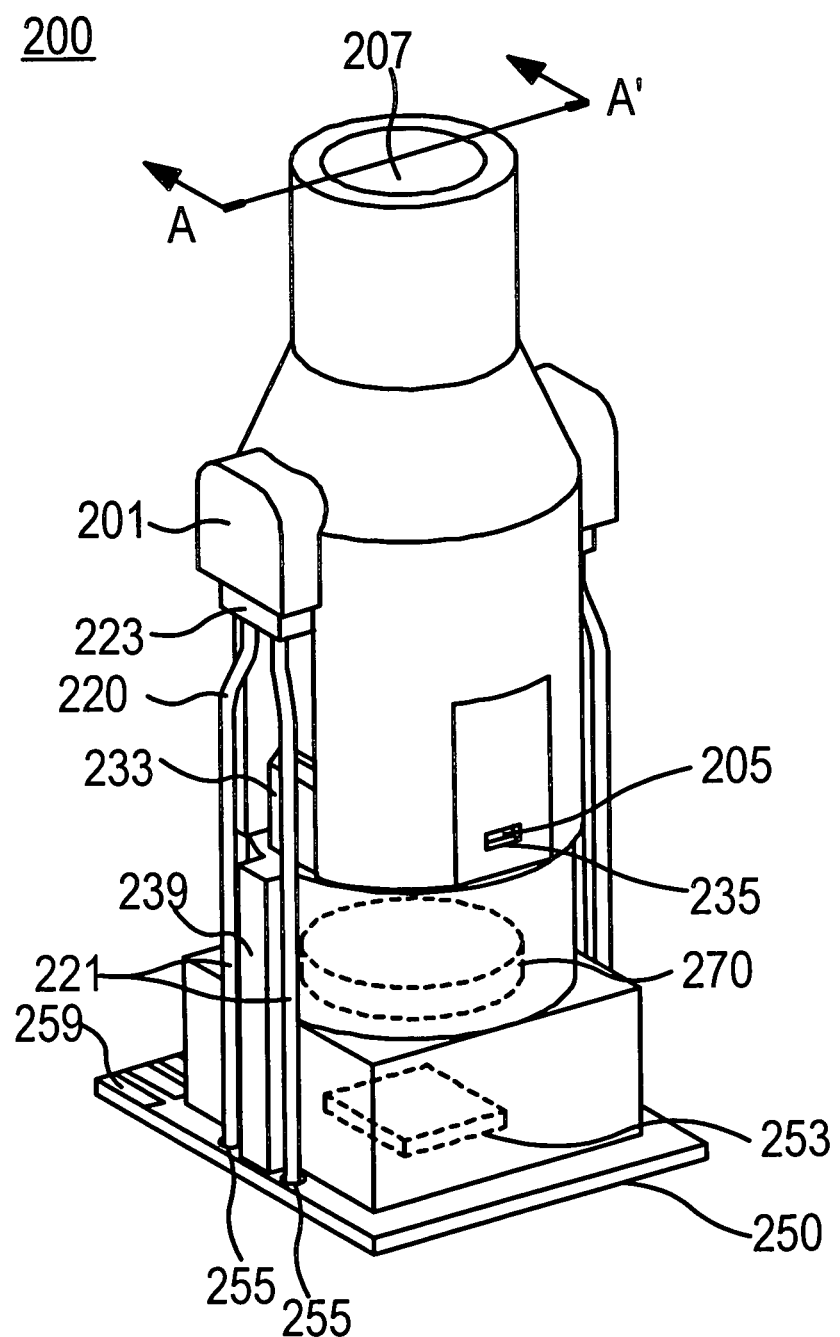
FIG. 3 is a perspective view of the optical identification module device in accordance with an embodiment of the invention.
Figure 4:
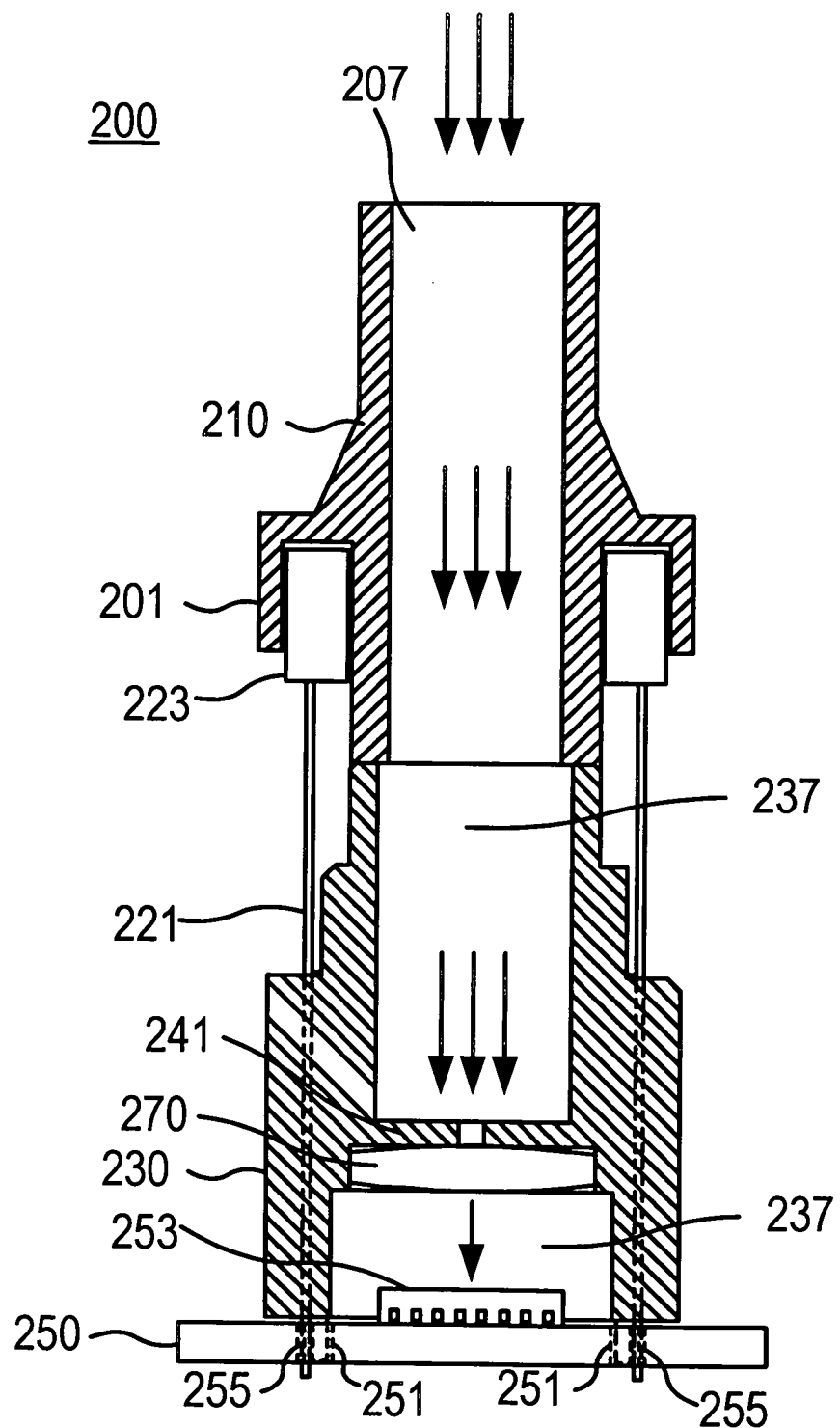
FIG. 4 is a cross-sectional view of the optical identification module device of FIG. 3, taken along line A-A'.

FIG. 2 is an exploded view of the optical identification module device 200 in accordance with an embodiment of the invention. FIG. 3 is a perspective view of the optical identification module device 200. FIG. 4 is a cross-sectional view of the optical identification module device of FIG. 3, taken along line A-A'. As shown in FIGS. 2, 3, and 4, the optical identification module device 200 includes a light pipe 210, at least one light emitting diode (LED) 220, a lens holder 230, a lens 270, and a sensing circuit board 250. In this embodiment, the at least one light emitting diode 220 is preferred to be two light emitting diodes 2201, 2202 placed at two sides of the light pipe 210, respectively.

The light pipe 210 is made by transparent material. The light pipe 210 is preferably made by acrylonitrile butadiene styrene (ABS) material integrally formed to be a hollow cylinder, with the upper part smaller than the lower part. At least one light source container 201 and at least one guiding recess 203 extended from the light source container 201 are arranged on one side of the light pipe 210. A first light channel 207 is defined in the light pipe 210. Two grooves 205 are arranged on the lower part of the light pipe 210. Preferably, the two grooves 205 are integrally formed and symmetrically arranged on the lower part of the light pipe 210. In this embodiment, the at least one light source container 201 includes two light source containers 2011, 2012 installed on two sides of the light pipe 210, and the at least one guiding recess 203 includes two guiding recesses 2031, 2032 respectively extended from the two light source containers 2011, 2012.

The lens holder 230 is a hollow base with a cylindrical upper part and a cubic lower part. At least one engaging bump 233 is arranged on one side of the lens holder 230 to correspondingly engage with the guiding recess 203 of the light pipe 210. At least one separating bump 239 aligned with the engaging bump 233 is also arranged on the side of the lens holder 230. A second light channel 237 corresponding to the first light channel 207 is defined in the lens holder 230. A plurality of positioning plugs 231 are formed on the bottom of the lens holder 230. In this preferred embodiment, the at least one engaging bump 233 includes two engaging bumps 2331, 2332 respectively engaged with the two guiding recesses 2031, 2032, and the at least one separating bump 239 includes two separating bumps 2391, 2392 respectively aligned with the two engaging bumps 2331, 2332.

Two tongues 235 are arranged on the upper part of the lens holder 230 to respectively engage with the two grooves 205 for fixedly installing the light pipe 210 on the lens holder 230. The lens holder 230 can be integrally formed with an opaque plastic material.

A light gate 241 is arranged in the second light channel 237 in order to filter the reflective light originated from the at least one light emitting diode 220. The lens 270 is arranged in the second light channel 237. The lens 270 is a convex lens.

The sensing circuit board 250 is arranged at the bottom of the lens holder 230 and has a receiver 253 soldered at a position corresponding to the second light channel 237. The receiver 253 receives the reflective light originated from the at least one light emitting diode 220 in order to covert the reflective light into an identifiable display signal. A plurality of positioning plug holes 251 are defined in the sensing circuit board 250 for being inserted with the plurality of positioning plugs 231, respectively.

A plug part 257 is arranged on one side of the circuit board 250. A plurality of golden fingers 259 are arranged on the plug part 257 for being inserted and soldered to a main circuit board. The golden fingers 259 are electrically connected to the receiver 253.

The at least one light emitting diode 220 is preferably an infrared light emitting diode. The at least one light emitting diode 220 has a light emitting body 223 and two pins 221 extended from the light emitting body 223. The emitting body 223 is placed in the at least one light source container 203. The two pins 221 are electrically connected to the sensing circuit board 250 along two sides of the at least one separating bump 239. A plurality of welding holes 255 are defined in the sensing circuit board 250 for being inserted and soldered with the two pins 221 of the at least one light emitting diode 220.

FIG. 3 is a perspective view of the optical identification module device 200 in accordance with an embodiment of the invention. As shown in FIG. 3, which illustrate the external structure of the optical identification module device 200, the light emitting body 223 is installed in the at least one light source container 201. Since the light pipe 210 is made of the transparent material, the infrared light produced by the light emitting body 223 can pass through the at least one light source container 201 and reach to a document surface so as to produce a reflective light.

FIG. 4 is a cross-sectional view of the optical identification module device of FIG. 3, taken along line A-A'. As shown in FIG. 4, after the light pipe 210 is combined with the lens holder 230, the first light channel 207 and the second light channel 237 form a tubular channel as a reflective light path. The reflective light originated from the at least, one light emitting diode 220 is filtered by the light gate 241, focused and refracted by the lens 270, and transmitted to the receiver 253.

Figure 5:
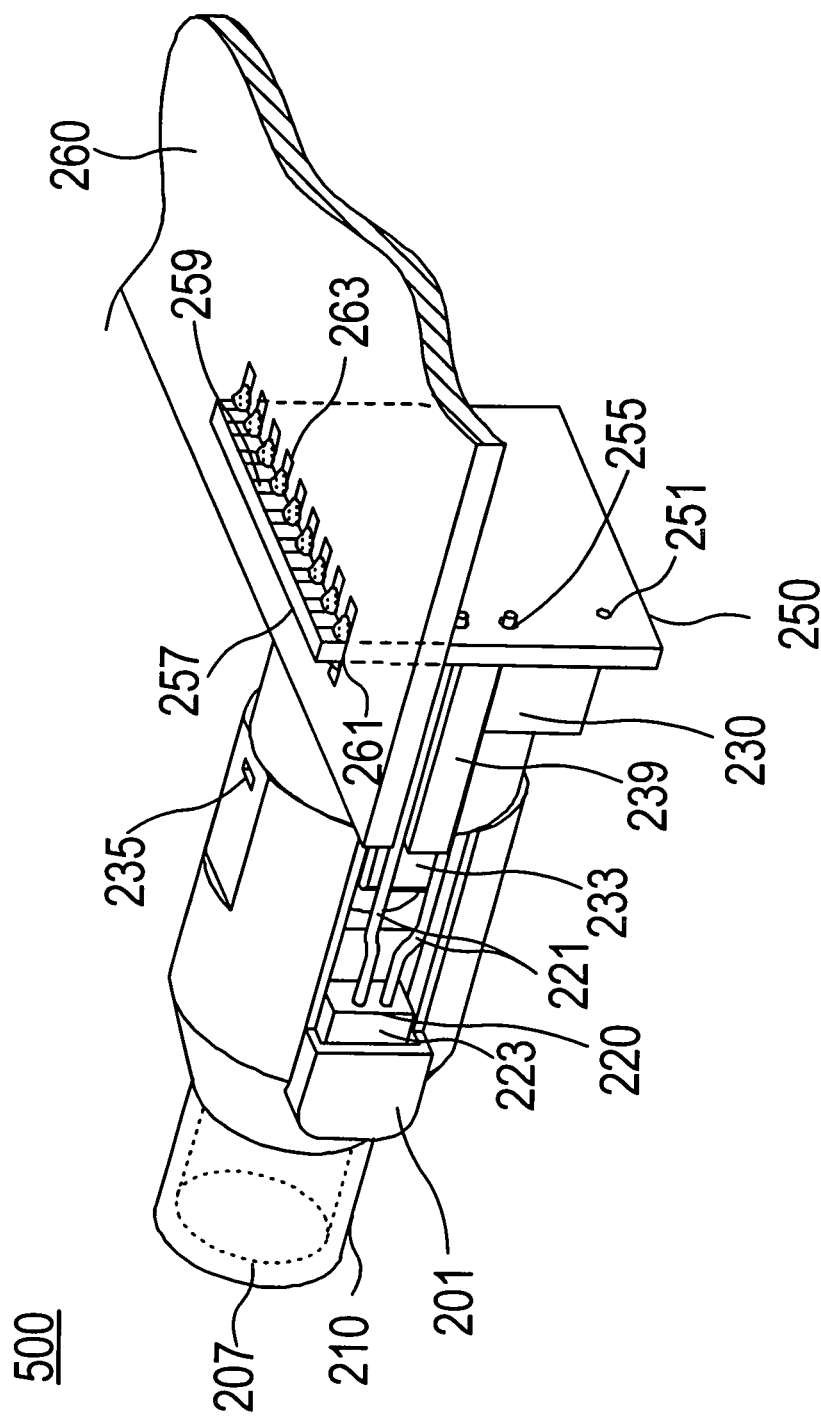
FIG. 5 is a schematic view of an optical reader having an optical identification module device in accordance with an embodiment of the invention.

FIG. 5 is a schematic view of an optical reader 500 having an optical identification module device in accordance with an embodiment of the invention. The optical reader 500 includes the optical identification module device 200 and a main circuit board 260.

As aforementioned, the optical identification module device 200 has a light pipe 210, a lens holder 230, a lens 270, a sensing circuit board 250, and at least one light emitting diode 220. The light pipe 210 is made of transparent material. A first light channel 207 is defined in the light pipe 210. The lens holder 230 engages with the light pipe 210. A second light channel 237 corresponding to the first light channel 207 is defined in the lens holder 230, and the lens 270 is arranged in the second light channel 237. The sensing circuit board 250 with a receiver 253 soldered at a position corresponding to the second light channel 237 is arranged at the bottom of the lens holder 230. A plug part 257 is formed on one side of the circuit board 250. A plurality of golden fingers 259 arranged on the plug part 257 are electrically connected to the receiver 253. The at least one light emitting diode 220 has a light emitting body 223 placed at two sides of the light pipe 210 and two pins 221 extended from the light emitting body. The two pins 221 are electrically connected to the sensing circuit board 250.

A slot 261 is defined in the main circuit board 260, and the plug part 257 of the circuit board 250 is vertically inserted therein for electrically connecting the circuit board 250 to the main circuit board 260. The main circuit board 260 has a plurality of welding points 263 arranged beside the slot 261 for soldering to the plurality of golden fingers 259 of the plug part 257, respectively.

As cited, the invention uses the light source container 201 to fixedly install the light emitting diode 220 for providing a steady light source and a consistent appearance without using an auxiliary plastic housing or heat shrink covering. In addition, it is easy to proceed with processing and re-working when the golden fingers of the sensing circuit board 250 are fixedly soldered with the main circuit board 260 directly, and in this case the pin header 125 for signal transfer is eliminated to effectively reduce the cost. Further, since the sensing circuit board 250 are fixedly soldered with the main circuit board 260 directly, the sensing circuit board 250 is not located at the center of the optical reader 500, and thus the space opposite to the sensing circuit board 250 can be used to place one or more cells or batteries. Thus, the high space utility relatively reduces the entire volume of the optical reader 500.

Although the present invention has been explained in relation to its preferred embodiment, it is to be understood that many other possible modifications and variations can be made without departing from the spirit and scope of the invention as hereinafter claimed.

What is claimed is:

1. An optical identification module device, comprising:
a light pipe made of transparent material, and having one side arranged thereon at least one light source container and at least one guiding recess extended from the light source container, wherein a first light channel is defined in the light pipe;
a lens holder having one side arranged thereon at least one engaging bump for correspondingly engaging with the at least one guiding recess, and at least one separating bump aligned with the at least one engaging bump, wherein a second light channel corresponding to the first light channel is defined in the lens holder;
a lens arranged in the second light channel;
a sensing circuit board arranged at a bottom of the lens holder and having a receiver soldered at a position corresponding to the second light channel; and
at least one light emitting diode having a light emitting body placed in the at least one light source container, and two pins extended from the light emitting body and electrically connected to the sensing circuit board along two sides of the at least one separating bump.

2. The device as claimed in claim 1, wherein the light pipe has two grooves arranged at the lower part of the said light pipe, and the lens holder has two tongues arranged on the upper part of the said light pipe for correspondingly engaging with the two grooves so as to fixedly install the light pipe on the lens holder.

3. The device as claimed in claim 2, wherein the lens holder has a plurality of positioning plugs installed on its bottom, and a plurality of positioning plug holes is installed on the sensing circuit board for correspondingly inserting the plurality of positioning plugs.

4. The device as claimed in claim 3, wherein the at least one light emitting diode is an infrared light source.

5. The device as claimed in claim 3, wherein the light pipe is integrally formed with acrylonitrile butadiene styrene (ABS) material.

6. The device as claimed in claim 3, wherein the lens is a convex lens.

7. The device as claimed in claim 3, wherein the receiver receives a reflective light originated from the at least one light emitting diode for converting the reflective light into an identifiable display signal.

8. The device as claimed in claim 3, wherein one side of the circuit board has a plug part arranged thereon a plurality of golden fingers for being inserted and soldered to a main circuit board, so that the plurality of golden fingers are electrically connected to the receiver.

9. An optical reader having an optical identification module device, comprising:
an optical identification module device, including:
a light pipe made of transparent material defined therein a first light channel;
a lens holder engaged with the light pipe and defined therein a second light channel corresponding to the first light channel;
a lens arranged in the second light channel;
a sensing circuit board arranged at a bottom of the lens holder, and having a receiver soldered at a position corresponding to the second light channel and a plug part formed on one side of the sensing circuit board, wherein a plurality of golden fingers are arranged on the plug part and the plurality of golden fingers are electrically connected to the receiver; and
at least one light emitting diode having a light emitting body placed at one side of the light pipe, and two pins extended from the light emitting body and electrically connected to the sensing circuit board; and
a main circuit board defined therein a slot for allowing the plug part of the sensing circuit board to be vertically inserted therein so that the sensing circuit board is electrically connected to the main circuit board.

10. The optical reader as claimed in claim 9, wherein the main circuit board has a plurality of welding points arranged beside the slot for respectively soldering to a plurality of golden fingers of the plug part.

11. The optical reader as claimed in claim 9, wherein at least one light source container and at least one guiding recess extended from the light source container are arranged on one side of the light pipe.

12. The optical reader as claimed in claim 11, wherein a lens holder has one side arranged thereon at least one engaging bump for correspondingly engaging with the at least one guiding recess and at least one separating bump aligned with the at least one engaging bump.

13. The optical reader as claimed in claim 12, wherein the light emitting body of the at least one light emitting diode is placed in the at least one light source container, and the two pins are electrically connected to the sensing circuit board along two sides of the at least one separating bump.

* * * * *